(12) United States Patent
Barker-Mill

(10) Patent No.: US 7,938,001 B2
(45) Date of Patent: May 10, 2011

(54) WIND INDICATOR HAVING A RESISTIVE PORTION PARALLEL TO FLUID FLOW

(76) Inventor: Jude Barker-Mill, London (GB)

( * ) Notice: Subject to any disclaimer, the term of this patent is extended or adjusted under 35 U.S.C. 154(b) by 101 days.

(21) Appl. No.: 12/307,242

(22) PCT Filed: Jun. 29, 2007

(86) PCT No.: PCT/GB2007/002457
§ 371 (c)(1),
(2), (4) Date: Feb. 19, 2009

(87) PCT Pub. No.: WO2008/003940
PCT Pub. Date: Jan. 10, 2008

(65) Prior Publication Data
US 2009/0266156 A1 Oct. 29, 2009

(30) Foreign Application Priority Data

Jul. 4, 2006 (GB) .................................. 0613276.5
Mar. 1, 2007 (GB) .................................. 0703979.5

(51) Int. Cl.
*G01W 1/00* (2006.01)
(52) U.S. Cl. ................................................... 73/170.05
(58) Field of Classification Search ........................ None
See application file for complete search history.

(56) References Cited

U.S. PATENT DOCUMENTS

| | | | |
|---|---|---|---|
| 3,343,412 A | | 9/1967 | Stout, Jr. |
| 3,791,211 A | | 2/1974 | Dobesch |
| 4,080,826 A | * | 3/1978 | Perretta ...................... 73/170.07 |
| 4,204,271 A | * | 5/1980 | Braly .............................. 362/145 |
| 4,597,287 A | * | 7/1986 | Thomas ..................... 73/170.03 |
| 5,117,690 A | * | 6/1992 | Baer ........................... 73/170.07 |
| 5,323,649 A | * | 6/1994 | Carlson ...................... 73/170.07 |
| 5,811,673 A | * | 9/1998 | Kwok et al. ............... 73/170.05 |
| 7,197,925 B2 | * | 4/2007 | Barker-Mill ............... 73/170.03 |

FOREIGN PATENT DOCUMENTS

| | | |
|---|---|---|
| DE | 3017060 A1 | 1/1982 |
| JP | 58073874 A | 5/1984 |
| JP | 59128452 A | 7/1984 |

OTHER PUBLICATIONS

European Office Action corresponding to European Patent Application No. 07733431.6, dated Mar. 12, 2010.

* cited by examiner

*Primary Examiner* — Andre J Allen
(74) *Attorney, Agent, or Firm* — Sughrue Mion, PLLC

(57) ABSTRACT

A direction indicator comprising a direction pointer arranged to pivot about a fulcrum and a flight mounted on the direction pointer that is capable of interacting with a fluid flow, the flight having a resistive portion resistive to fluid flow in a direction parallel to a longitudinal axis of the direction pointer, the resistive portion being substantially effective to cause the direction pointer to pivot about the fulcrum and thereby align the flight with the direction of the fluid flow.

4 Claims, 4 Drawing Sheets

WIND INDICATOR HAVING A RESISTIVE PORTION PARALLEL TO FLUID FLOW

The present invention relates to a device for indicating the direction of a fluid flow.

One known device for indicating the direction of fluid flow is a weathervane. A typical weathervane is illustrated in FIG. 1. The weathervane 101 consists of a pointer 102 pivotally mounted on a support 103 and a flight 104. The pointer has been provided with a simple arrow head 105 for pointing towards the direction from which the wind is blowing. The flight is substantially flat.

When the weathervane 201 is placed in an airflow 202, as shown in FIG. 2a, and the vane is not aligned with that airflow, the moving air collides with the flight 203 and exerts a force on the vane that causes it to rotate about the support 204. When the vane has rotated far enough, the flight becomes aligned with the airflow, as shown in FIG. 2b. In this configuration, the air moves parallel to the flight. The air does not collide with the flight and so no force is exerted perpendicular to the vane by the airflow. The vane therefore stops rotating. If the direction of the airflow changes, e.g. if the prevailing wind changes direction, then moving air once again collides with the flight. This causes the vane to rotate about its pivot until the flight is once again aligned with the airflow.

Instead of comprising a rod-like direction pointer as shown in FIGS. 1 and 2, many known weathervanes consist of a plate that is rotatable about an axis. The plate is typically fashioned into a representation of an object or animal, such as a rooster, horse, car etc. The principle of operation for these vanes is generally the same as that described above, with the plate acting as the flight. However, one difference is that the plate typically extends on both sides of the axis of rotation. The prevailing wind therefore impacts the plate on both sides of the axis. The force exerted by the wind on one side of the axis will act in a clockwise direction and the force exerted by the same wind on the other side of the axis will act in an anti-clockwise direction. If these forces are equal, the vane will not rotate. It is therefore important for the plate to be arranged so that its surface area is larger on one side of the axis than on the other. This ensures that the force exerted in one direction by a given air pressure is greater than the force exerted in the opposite direction, so that there is a dominant force to cause the vane to rotate into alignment with the prevailing wind direction.

The flights used in indicators of fluid flow direction are generally of the form shown in FIGS. 2a and 2b. However, flights having this form have the following disadvantages. First, fluid flow indicators having a flight with a substantially flat form are not particularly sensitive to the direction of fluid flow in low speed flows. Second, fluid flow indicators having a flight with a substantially flat form are not particularly sensitive to small changes in direction of fluid flow. Third, fluid flow indicators having a flight with a substantially flat form are prone to "flutter", i.e. the flight can tend to oscillate around the direction of fluid flow. This makes it difficult to determine the direction of flow precisely.

There is therefore a need for an improved device for indicating a direction of fluid flow.

According to an embodiment of the invention, there is provided a direction indicator comprising a direction pointer arranged to pivot about a fulcrum and a flight mounted on the direction pointer that is capable of interacting with a fluid flow, the flight having a resistive portion resistive to fluid flow in a direction parallel to a longitudinal axis of the direction pointer, the resistive portion being substantially effective to cause the direction pointer to pivot about the fulcrum and thereby align the flight with the direction of the fluid flow.

Preferably the resistive portion is offset from the fulcrum such that interaction between the resistive portion and a fluid flow can cause a torque to be applied to the direction pointer about the fulcrum.

Preferably the resistive portion projects from the direction pointer to form a surface that extends transversely to the longitudinal axis of the direction pointer.

The resistive portion may project from the direction pointer such that the flight widens progressively away from the fulcrum.

The flight may be truncated such that at its end furthest from the fulcrum it terminates with a substantially flat surface transverse to the longitudinal axis of the direction pointer.

Preferably the configuration of the resistive portion is such as to direct fluid flowing around the flight adjacent to a near surface of the resistive portion or to a far surface of the resistive portion, the near surface of the resistive portion being capable of interacting with the fluid flowing adjacent to it such that the direction pointer can be caused to pivot about the fulcrum into alignment with the direction of fluid flow and the far surface of the resistive portion being capable of interacting with the fluid flowing adjacent to it such that a torque opposing said pivoting motion can be applied to the direction pointer about the fulcrum.

The resistive portion may have a greater extent parallel to the longitudinal axis of the direction pointer than transverse to the longitudinal axis of the direction pointer.

The flight may be a cylinder arranged such that its axis is transverse to the longitudinal axis of the direction pointer. The cylinder may have a triangular cross-section in a plane parallel to an axis between the cylinder and the fulcrum. The cylinder may have a circular cross-section in a plane parallel to an axis between the cylinder and the fulcrum. The cylinder may have a semi-circular cross-section in a plane parallel to an axis between the cylinder and the fulcrum.

For a better understanding of the present invention, reference is made to the following drawings in which.

Figure 1:
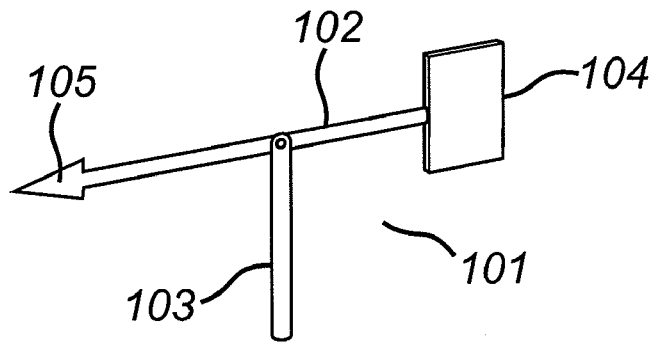
FIG. 1 shows a typical weathervane.
Figure 2A:
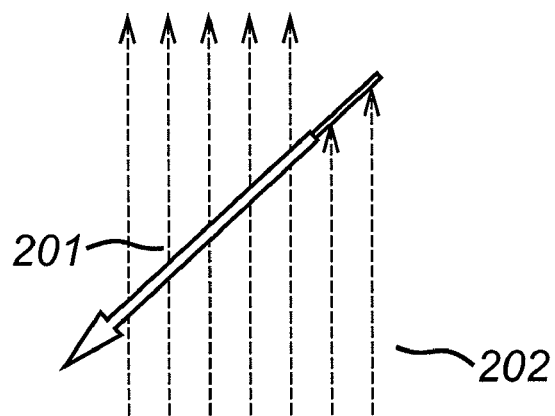
FIGS. 2a and 2b show a weathervane that is out of alignment and in alignment with a prevailing wind respectively.
Figure 2B:
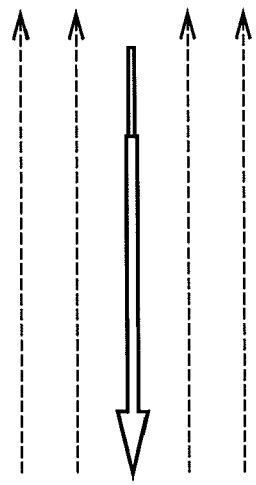
Figure 3:
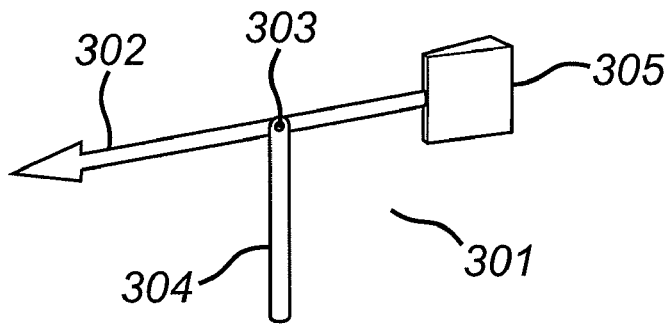
FIG. 3 shows a weathervane according to an embodiment of the invention.

FIG. 3 shows a direction indicator according to an embodiment of the invention. The indicator is shown generally at 301 and comprises a direction pointer 302, which is pivotable about a fulcrum 303, and a flight 305. The direction indicator is mounted on a support 304. The direction indicator operates according to the same general principle as existing vanes, with a fluid flow exerting a force on the flight that causes it to pivot about the fulcrum into alignment with the prevailing direction of the fluid flow.

The invention will be described with reference to examples in which the flights have specific shapes. Many of the examples have flights that are wedge-shaped. However, it should be understood that this is for the purposes of example only. There are many different shapes of flight that are encompassed by the invention and some of these are described below.

As can be seen from FIG. 3, the direction indicator differs from existing vanes in that the flight is not substantially flat. Instead, the flight projects outward from the rotating portion such that at least one of its surfaces protrudes into the fluid flow, even when the flight is aligned with the flow direction.

The flight according to embodiments of the invention has an increased bulk compared with the substantially flat flight used by conventional weathervanes. In general terms, this increased bulk means that the flight is "caught" by fluid flow more readily than a conventional flat flight. A direction indicator that incorporates such a flight is therefore more sensitive, particularly at low fluid speeds.

This increased sensitivity is in part due to the flight of increased bulk having a larger surface area protruding into the fluid flow, so that more of the fluid collides with the flight. A larger force is therefore exerted on the flight of increased bulk than would be exerted on a substantially flat flight of comparable dimensions by the same fluid flow. The increased force causes a larger torque to be exerted on the direction pointer about the fulcrum. Any frictional resistance to rotation in the pivotal connection between the direction pointer and its support can therefore be overcome at lower flow speeds.

Figure 4A:
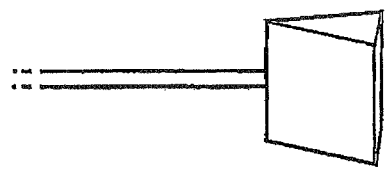
FIGS. 4a to 4f show different forms of flight according to embodiments of the invention.
Figure 4B:
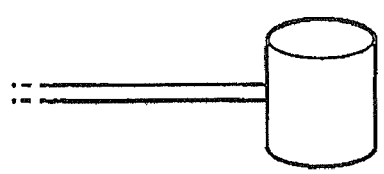
Figure 4F:
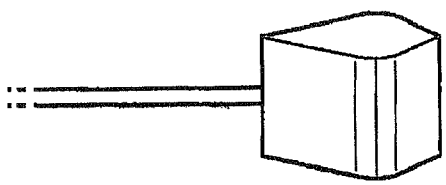
Figure 4C:
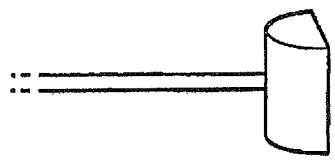
Figure 4D:
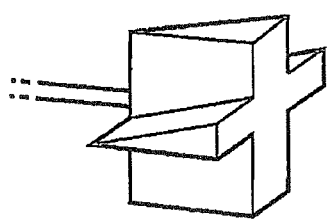

The present invention encompasses any flight that resists fluid flow parallel to the longitudinal axis of the direction pointer, i.e. the central axis of the direction pointer that connects the fulcrum and the flight. However, FIGS. 4a to 4d illustrate some specific shapes of flight by way of example. FIGS. 4a to 4c show wind indicators that have cylindrical flights. In FIG. 4a the cylinder has a triangular cross-section, i.e. the flight is wedge-shaped. In FIG. 4b the cylinder has a circular cross-section. In FIG. 4c the flight is truncated so the cylinder has a semi-circular cross-section. The flight need not be cylindrical. FIG. 4d shows a cruciform wind indicator in which the arms of the cross are each wedge-shaped. These specific shapes are examples only, and should not be construed as limiting the scope of the invention.

Figure 4E:
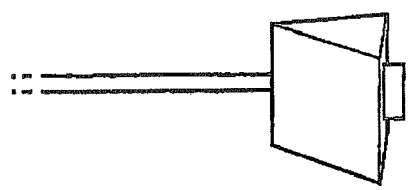

The flights illustrated in FIGS. 4a and 4c have a truncated form. Experiments conducted by the inventor indicate that terminating the flight with a flat surface transverse to the longitudinal axis of the direction pointer contributes significantly to the accuracy of the direction indicator. A flight having such a truncated form could have an additional vane at the rear of the flight to assist in aligning the direction pointer with the direction of fluid flow. A flight having this form is shown in FIG. 4e. Alternatively, rather than having a truncated form, the flight could taper to a point. A flight having this form is shown in FIG. 4f.

The advantages provided by a direction indicator according to embodiments of the invention will now be described with specific reference to a direction indicator having a wedge-shaped flight.

The wedge-shaped flight shown in FIG. 4a increases the sensitivity of the direction indictor. This is particularly advantageous at low fluid speeds when the pivoting force imparted to the direction indicator by the fluid flow tends to be small. This increased sensitivity is partly a result of the angled surface of the flight that protrudes into the fluid flow. The angle between the protruding surface of the wedge-shaped flight and the incoming fluid flow is greater than the angle between the same incoming fluid flow and a substantially flat flight. This comparison is illustrated in FIGS. 4a and 4b.

Figure 5A:
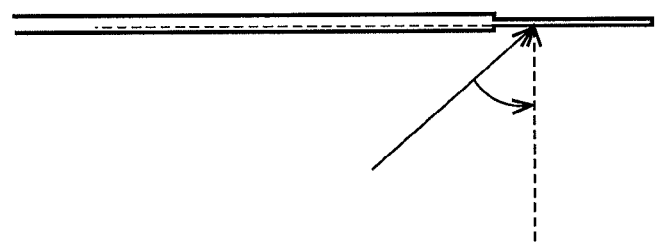
FIGS. 5a and 5b show a conventional flat flight and a wedge-shaped flight in a fluid flow respectively.
Figure 5B:
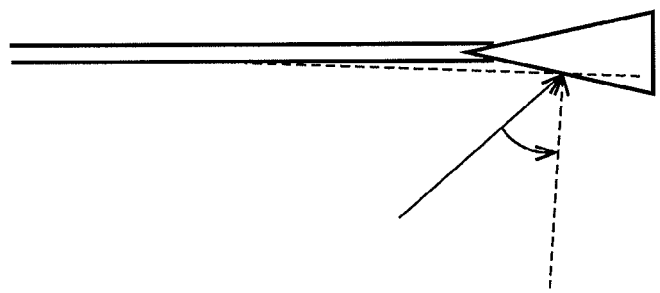

As can be seen from FIGS. 5a and 5b, the angle between the direction of the fluid flow and the protruding surface of the flight is larger for the wedge-shaped flight than for the substantially flat flight. Therefore, the force acting on the flight perpendicularly to the line connecting the fulcrum to the point of action of the force (i.e. the force that causes the vane pivot about the fulcrum) is larger for the wedge-shaped flight than for the substantially flat flight for a given fluid flow. The increased force exerted on the flight renders the wedge-shaped flight more responsive than the flat flight at any given fluid speed.

The increased pivoting force is particularly advantageous at low fluid speeds when the force imparted to a substantially flat flight might be too low to overcome friction in the pivotal joint between the rotating portion and the support. With the wedge-shaped flight, this frictional resistance can be overcome at lower fluid speeds, thus rendering the direction indicator more sensitive.

Figure 6A:
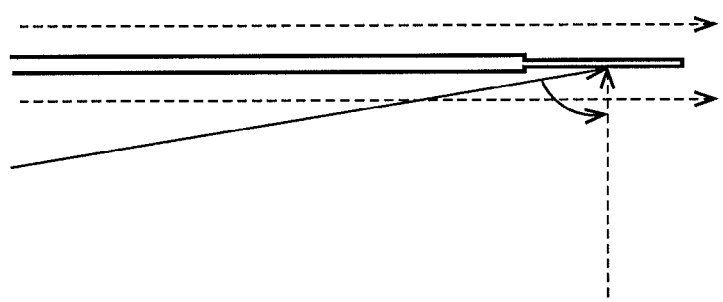
FIGS. 6a and 6b show a conventional flat flight and a wedge-shaped flight respectively in a fluid flow that is changing direction.
Figure 6B:
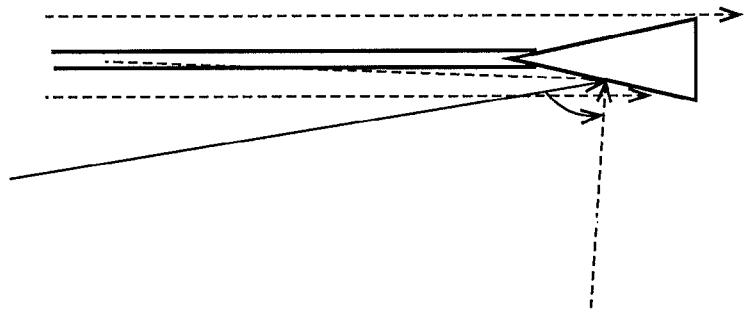

A further advantage of the wedge-shaped flight is that it renders the direction indicator more sensitive to small changes in the direction of fluid flow. This advantage can be appreciated from FIGS. 6a and 6b, which illustrate both a flat flight and a wedge-shaped flight aligned with the direction of fluid flow (shown by the dashed lines). If the direction of fluid flow subsequently alters slightly (as shown by the solid lines) then it can be seen that the torque acting on the direction indicator is again greater for the wedge-shaped flight than for the flat flight.

Once again, the increased torque that acts on the direction indicator having a wedge-shaped flight as a result of a change in fluid direction means that frictional resistance in the pivotal joint is more likely to be overcome in the improved direction indicator for a given change in fluid direction than in a direction indicator having a conventional flat flight. This is particularly advantageous when the changes in fluid flow direction are small, such that the pivoting force applied by the fluid flow tends to be low. The direction indicator incorporating the wedge-shaped flight is therefore more sensitive to changes in fluid flow direction than a direction indicator having a conventional flat flight.

It can be seen that the above advantages result from the projection of the flight outward from the longitudinal axis of the rotating portion. Therefore, although these advantages have been described with specific reference to a wedge-shaped flight, it should be understood that the invention encompasses any direction indicator having a flight that projects into a fluid flowing parallel to the rotating portion of the direction indicator, and therefore has a significant effect in aligning the direction indicator with the direction of fluid flow.

A direction indicator having a flight of increased bulk therefore has improved sensitivity as it is more responsive to low speed fluid flows and to small changes in fluid direction. In addition, a flight of increased bulk can have the additional advantage of reducing "flutter".

Figure 7A:
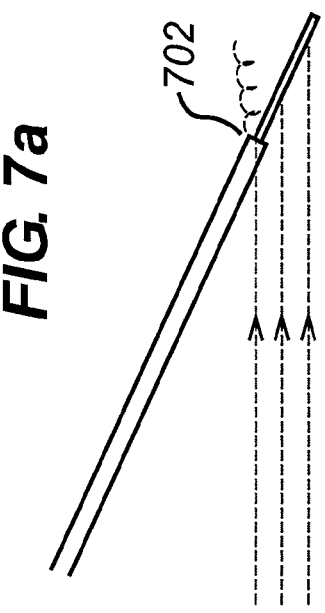
FIGS. 7a to 7c show a direction indicator having a conventional flat flight as it moves into alignment with the direction of fluid flow.
Figure 7B:
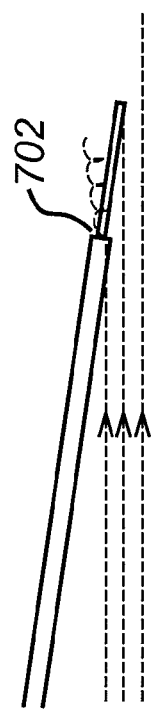
Figure 7C:
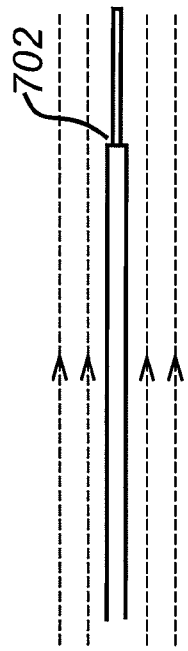

Direction indicators incorporating a conventional flat flight can tend to be susceptible to flutter as the flight oscillates around the direction of fluid flow rather than remaining steadily aligned with the direction of fluid flow. FIG. 7a illustrates a substantially flat flight that is out of alignment with the direction of fluid flow. As can be seen from the figure, the fluid flow impacting the near surface of the flight must change direction rapidly. The fluid therefore exerts a force on the surface as it changes direction that causes the direction indicator to rotate about its axis, thereby bringing the direction indicator into alignment with the direction of fluid flow. The front of the flight also acts as a trigger point 702 that causes the fluid flow to become turbulent adjacent to the far surface of the flight. This turbulence causes a pressure drop that helps to drag the direction indicator into alignment with the direction of fluid flow. FIG. 7b illustrates a substantially flat flight that is nearly in alignment with the direction of fluid flow. The fluid flow in this scenario is similar to the "out of alignment" scenario in that the change of direction of the fluid impacting the near face of the flight causes the direction indicator to rotate so that it is brought into alignment with the direction of fluid flow. The front of the flight 702 also provides the trigger point that causes the fluid flow to become turbulent, thereby creating the pressure drop that helps to drag the direction indicator into alignment. FIG. 7c illustrates the direction indicator in alignment with the fluid flow, when the fluid flows parallel to the longitudinal axis of the direction indicator.

Figure 8A:
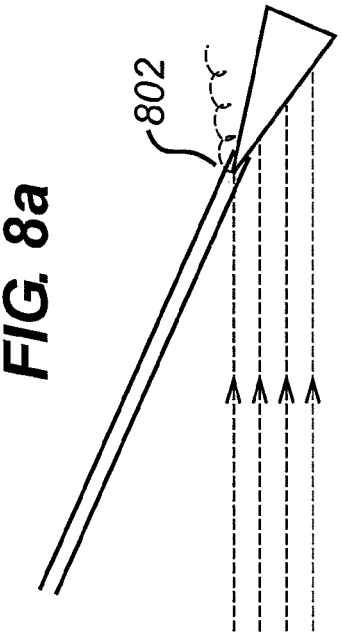
FIGS. 8a to 8c show a direction indicator having a wedge-shaped flight as it moves into alignment with the direction of fluid flow.
Figure 8B:
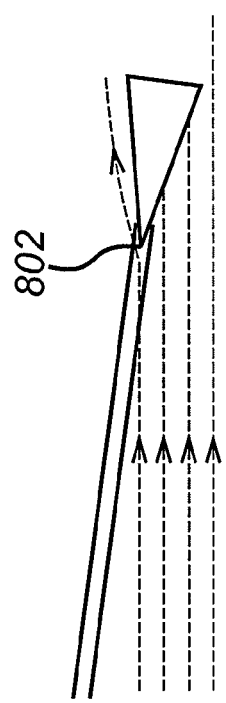
Figure 8C:
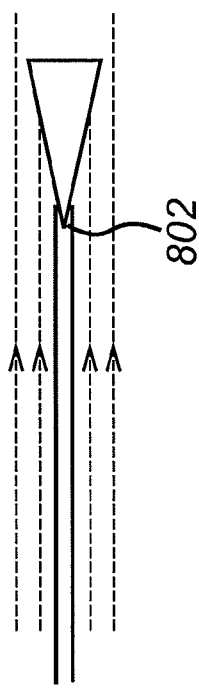

FIGS. 8a to 8c illustrate similar scenarios to those in FIGS. 7a to 7c but for a direction indicator having a wedge-shaped flight. The situation when the direction indicator is out of alignment with the direction of fluid flow is similar to that for the substantially flat flight. Fluid impacting the near surface of the wedge-shaped flight is forced to change direction rapidly, thereby exerting a force on the flight that causes the direction indicator to rotate about its axis and move into alignment with the direction of the fluid flow. Compared with the substantially flat flight, the fluid has to make a greater direction change to accommodate the angled surface of the wedge-shaped flight and so the force exerted on the flight is correspondingly larger (as explained above). The front of the wedge-shaped flight also provides trigger point 802 that causes the fluid flow to become turbulent as it flows to the far side of the flight. The turbulent flow causes a pressure drop by the far surface of the flight that helps to drag the flight, and hence the direction indicator, into alignment with the direction of fluid flow.

The flat rear surface of the wedge-shaped flight also helps to bring the direction indicator into alignment with the direction of fluid flow. The back of the wedge-shaped flight acts as a trigger point in a similar way to the front of the flight, i.e. each of the two rearmost edges of the flight act as trigger points. This causes a turbulent flow to form in the region behind the flight, which assists in bringing the direction pointer into alignment with the direction of fluid flow.

The situation when a direction indicator having wedge-shaped flight is nearly in alignment with the direction of fluid flow is different from the situation for a direction indicator having a substantially flat flight. This situation is illustrated in FIG. 8b. When the direction indicator is nearly aligned with the direction of fluid flow the fluid impacting the near surface of the flight must change direction, as before, and in so doing exerts a force on the flight that causes the direction indicator to rotate about its axis. The difference between this situation and that for a substantially flat flight that is nearly aligned with the direction of fluid flow is in the effect that the front of the flight has on the fluid flowing past the front of the flight to the far surface. Because the far surface of the flight is angled with respect to the longitudinal axis of the direction indicator, the fluid flowing over the front of the flight does not need to change direction so abruptly in order to remain in contact with the flight. The front of the wedge-shaped flight therefore does not act as a trigger point in the same way as when the direction indicator is substantially out of alignment with the direction of fluid flow. Instead, the fluid flowing over the far surface of the flight retains some laminar characteristics. The fluid flowing over the far surface of the wedge-shaped flight therefore exerts a force on the flight in the opposite direction to that exerted on the near surface of the flight by the remainder of the fluid. The force exerted on the far surface of the flight is less than that exerted on the near surface of the flight, and therefore the direction indicator continues to rotate about its axis. However, the force exerted on the far surface of the flight acts to slow the angular velocity of the direction indicator as it becomes aligned with the direction of the fluid flow. As the flight moves into alignment with the direction of fluid flow, the force exerted on the far surface of the flight increases to eventually become equal to that exerted on the near surface of the flight at the point of alignment.

The reduction in speed as the direction indicator moves into alignment with the direction of fluid flow inhibits the direction indicator from overshooting the point of alignment due to its angular momentum. Overshooting the point of alignment can cause a direction indicator to oscillate, as the flight is forced back and forth by the fluid impacting it first in one direction and then in the other until the angular momentum of the flight is reduced sufficiently for it to remain steadily aligned with the direction of fluid flow. Direction indicators that use substantially flat flights are especially prone to such oscillations.

A direction indicator incorporating a flight according to embodiments of the invention is therefore less prone to oscillating about the point of alignment with the direction of fluid flow as the shape of the flight is such that the direction indicator decelerates as it reaches the point of alignment. While this advantageous effect has been described specifically with reference to a wedge-shaped flight, it should be understood that the invention is not limited to any specific shape of flight. In particular, the invention encompasses any direction indicator having a flight that interacts with fluid flow in the way described above, so that the direction indicator decelerates as it approaches the point of alignment.

A further advantage of a flight of increased bulk arises when the direction indicator is substantially aligned with the fluid flow. FIGS. 7c and 8c illustrate a wedge-shaped flight and a substantially flat flight respectively that are aligned with a fluid flow. It can be appreciated from the figures that while no force is applied to the surface of the flat flight when it is aligned with the direction of fluid flow, the angled surface of the wedge-shaped flight means that the fluid flow continues to collide with the flight, even when it is aligned with the direction of fluid flow. The forces acting on each of the protruding surfaces of the wedge-shaped flight are equal in magnitude but opposite in direction, thus helping to stabilise the vane in alignment with the direction of fluid flow. There are no such stabilising forces acting on the flat flight, which thus tends to move out of alignment with the fluid flow.

In another embodiment the flight could be of circular cross section, the axis of the cylinder being transverse to the axis joining the cylinder to the fulcrum of the vane (as shown in FIG. 4b). In this embodiment, drag on the cylinder may enhance the ability of the vane to point to the direction of fluid flow.

The flight could be positioned adjoining the fulcrum about which the direction indicator pivots. Preferably, however, the flight is offset from the fulcrum so that the perpendicular offset between the fulcrum and the flight means that a torque is applied to the direction pointer about the fulcrum by the interaction between the fluid flow and the flight. The greater the perpendicular displacement between the flight and the fulcrum, the greater the "lever effect" of that displacement will be and so the larger the torque that will be applied about the fulcrum for a given force exerted on the flight.

Although the direction indicators shown in the figures all have a direction pointer in the form of a rod, it should be understood that the invention encompasses any suitable form of direction pointer. For example, the direction pointer could take the form of a plate rotatable about an axis.

A direction indicator according to embodiments of the invention may suitably be used to indicate the direction of any kind of fluid flow. For example, the direction indicator could act as a weathervane for indicating a wind direction. Alternatively, the direction indicator could be used to indicate the direction of flow of a liquid, such as water. The direction indicator could suitably be used in applications such as sailing vessels, guidance systems etc.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

The invention claimed is:

1. A direction indicator comprising:
   a direction pointer arranged to pivot about a fulcrum and having a longitudinal axis; and
   a flight mounted on the direction pointer that is configured to interact with a fluid flow, the flight having a resistive portion that widens progressively away from the fulcrum and that projects from the direction pointer to form a first surface which extends transversely to the longitudinal axis of the direction pointer, said first surface protruding into the fluid flow when the direction pointer is aligned with the direction of that flow such that the resistive portion is resistive to fluid flow in a direction parallel to the longitudinal axis of the direction pointer, the resistive portion being substantially effective to cause the direction pointer to pivot about the fulcrum and thereby align the flight with the direction of the fluid flow; and wherein the flight terminates at its end furthest from the fulcrum with a substantially flat rear second surface transverse to the longitudinal axis of the direction pointer.

2. A direction indicator as claimed in claim 1, wherein the resistive portion is offset from the fulcrum such that interaction between the resistive portion and a fluid flow can cause a torque to be applied to the direction pointer about the fulcrum.

3. A direction indicator as claimed in claim 1, wherein the first surface of the resistive portion is such as to direct fluid flowing around the flight adjacent to a near surface of the resistive portion or to a far surface of the resistive portion, the near surface of the resistive portion being configured to interact with the fluid flowing adjacent to it such that the direction pointer can be caused to pivot about the fulcrum into alignment with the direction of fluid flow and the far surface of the resistive portion being configured to interact with the fluid flowing adjacent to it such that a torque opposing said pivoting motion can be applied to the direction pointer about the fulcrum.

4. A direction indicator as claimed in claim 1, wherein the resistive portion has a greater extent parallel to the longitudinal axis of the direction pointer than transverse to the longitudinal axis of the direction pointer.

* * * * *